US011243408B2

(12) United States Patent
Harden, Jr. et al.

(10) Patent No.: US 11,243,408 B2
(45) Date of Patent: Feb. 8, 2022

(54) SPECKLE CONTRAST REDUCTION INCLUDING HIGH-SPEED GENERATION OF IMAGES HAVING DIFFERENT SPECKLE PATTERNS

(71) Applicants: GM GLOBAL TECHNOLOGY OPERATIONS LLC, Detroit, MI (US); KENT STATE UNIVERSITY, Kent, OH (US)

(72) Inventors: John Ernest Harden, Jr., Streetsboro, OH (US); Liang-Chy Chien, Hudson, OH (US); Kai-Han Chang, Madison Heights, MI (US); Thomas A. Seder, Fraser, MI (US)

(73) Assignees: GM GLOBAL TECHNOLOGY OPERATIONS LLC, Detroit, MI (US); KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 16/782,856

(22) Filed: Feb. 5, 2020

(65) Prior Publication Data
US 2021/0239996 A1 Aug. 5, 2021

(51) Int. Cl.
*G02B 27/48* (2006.01)
*G02F 1/133* (2006.01)
(Continued)

(52) U.S. Cl.
CPC ............. *G02B 27/48* (2013.01); *G02F 1/137* (2013.01); *G02F 1/1347* (2013.01);
(Continued)

(58) Field of Classification Search
CPC ................. G02B 27/48; G02F 1/13306; G02F 1/134309; G02F 1/1347; G02F 1/137; G02F 2201/16
See application file for complete search history.

(56) References Cited

U.S. PATENT DOCUMENTS 10,302,937 B2    5/2019  Ferris et al.
2008/0062353 A1* 3/2008  Wang ................ G02F 1/133382
                                                    349/72
(Continued)

FOREIGN PATENT DOCUMENTS

WO    WO-2018180271 A1 * 10/2018 ............. G03B 21/62

OTHER PUBLICATIONS

U.S. Appl. No. 16/120,572, filed Sep. 4, 2018, Chang.
(Continued)

*Primary Examiner* — Nathanael R Briggs

(57) ABSTRACT

A speckle reduction system is provided and includes a speckle reduction component and a control module. The speckle reduction component includes electrode layers and a liquid crystal layer. The liquid crystal layer is disposed between the electrode layers and configured to receive light from a coherent light source. The control module is configured to (i) supply a first voltage signal having a first voltage to the electrode layers to provide a first speckle pattern output, and (ii) supply a second voltage signal having a second voltage to the electrode layers to provide a second speckle pattern output, wherein the first voltage and the second voltage are greater than zero. The control module is configured to transition between providing the first voltage signal and the second voltage signal in less than at least one of half an integration time of a human eye or 8 milliseconds.

11 Claims, 8 Drawing Sheets

(51) Int. Cl.
*G02F 1/1343* (2006.01)
*G02F 1/1347* (2006.01)
*G02F 1/137* (2006.01)

(52) U.S. Cl.
CPC .... *G02F 1/13306* (2013.01); *G02F 1/134309* (2013.01); *G02F 2201/16* (2013.01)

(56) References Cited

U.S. PATENT DOCUMENTS

| | | | |
|---|---|---|---|
| 2008/0084522 A1* | 4/2008 | Lee | G02F 1/1334 349/88 |
| 2010/0110364 A1* | 5/2010 | Teunissen | G02B 27/48 349/201 |
| 2016/0109701 A1 | 4/2016 | Goldman-Shenhar et al. | |
| 2017/0161949 A1 | 6/2017 | Seder et al. | |
| 2017/0161950 A1 | 6/2017 | Seder et al. | |
| 2019/0196216 A1* | 6/2019 | Hansford | G02F 1/13718 |

OTHER PUBLICATIONS

U.S. Appl. No. 16/120,641, filed Sep. 4, 2018, Chang.
U.S. Appl. No. 16/363,536, filed Mar. 25, 2019, Chang et al.
U.S. Appl. No. 16/373,056, filed Apr. 2, 2019, Chang et al.
U.S. Appl. No. 16/379,439, filed Apr. 9, 2019, Chang et al.
U.S. Appl. No. 16/418,574, filed May 21, 2019, Chang et al.
U.S. Appl. No. 16/459,994, filed Jul. 2, 2019, Seder et al.
U.S. Appl. No. 16/531,744, filed Aug. 5, 2019, Chang et al.
U.S. Appl. No. 16/531,844, filed Aug. 5, 2019, Chang et al.
U.S. Appl. No. 16/549,606, filed Aug. 23, 2019, Chang et al.
U.S. Appl. No. 16/553,475, filed Aug. 28, 2019, Chang et al.
U.S. Appl. No. 16/560,035, filed Sep. 4, 2019, Chang et al.
U.S. Appl. No. 16/599,777, filed Oct. 11, 2019, Chang et al.
U.S. Appl. No. 16/661,227, filed Oct. 23, 2019, Chang et al.
U.S. Appl. No. 16/676,213, filed Nov. 6, 2019, Harden et al.
U.S. Appl. No. 16/688,139, filed Nov. 19, 2019, Wells et al.
U.S. Appl. No. 16/711,271, filed Dec. 11, 2019, Chang et al.

* cited by examiner

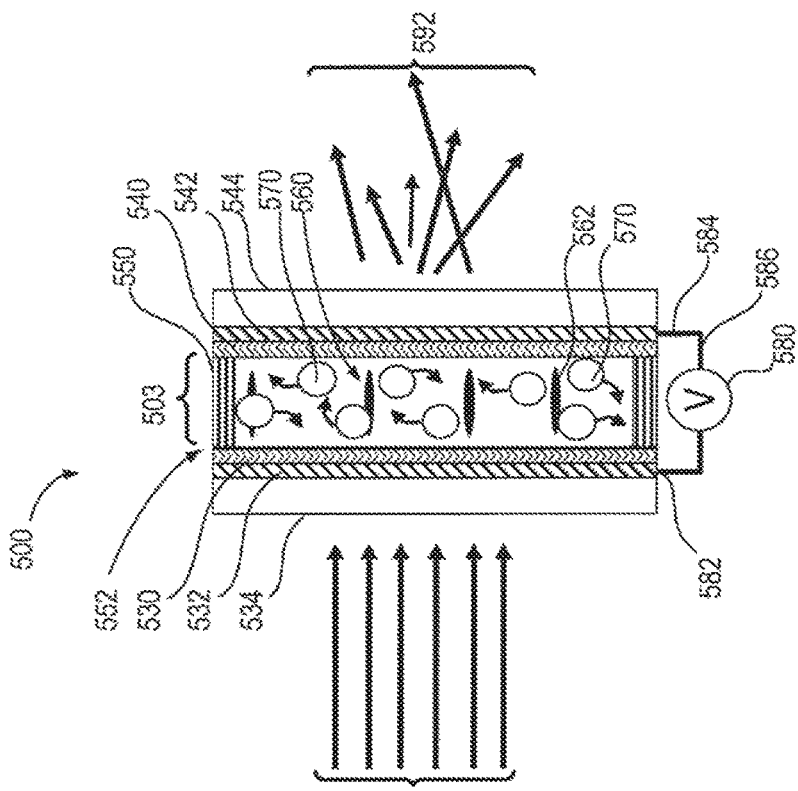
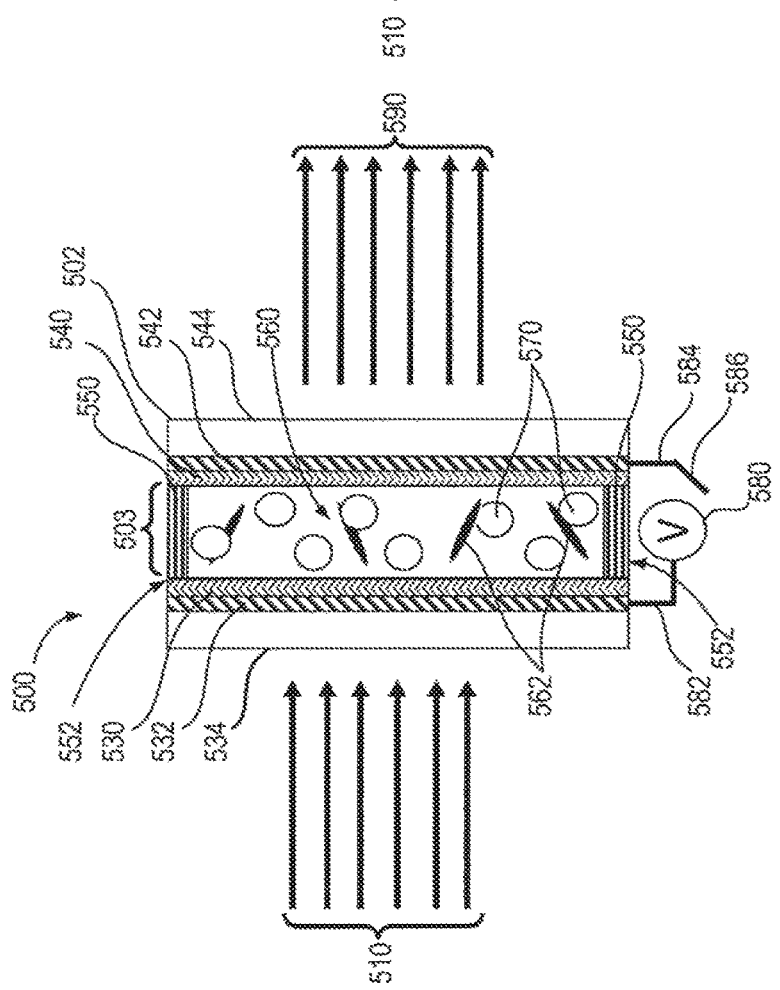

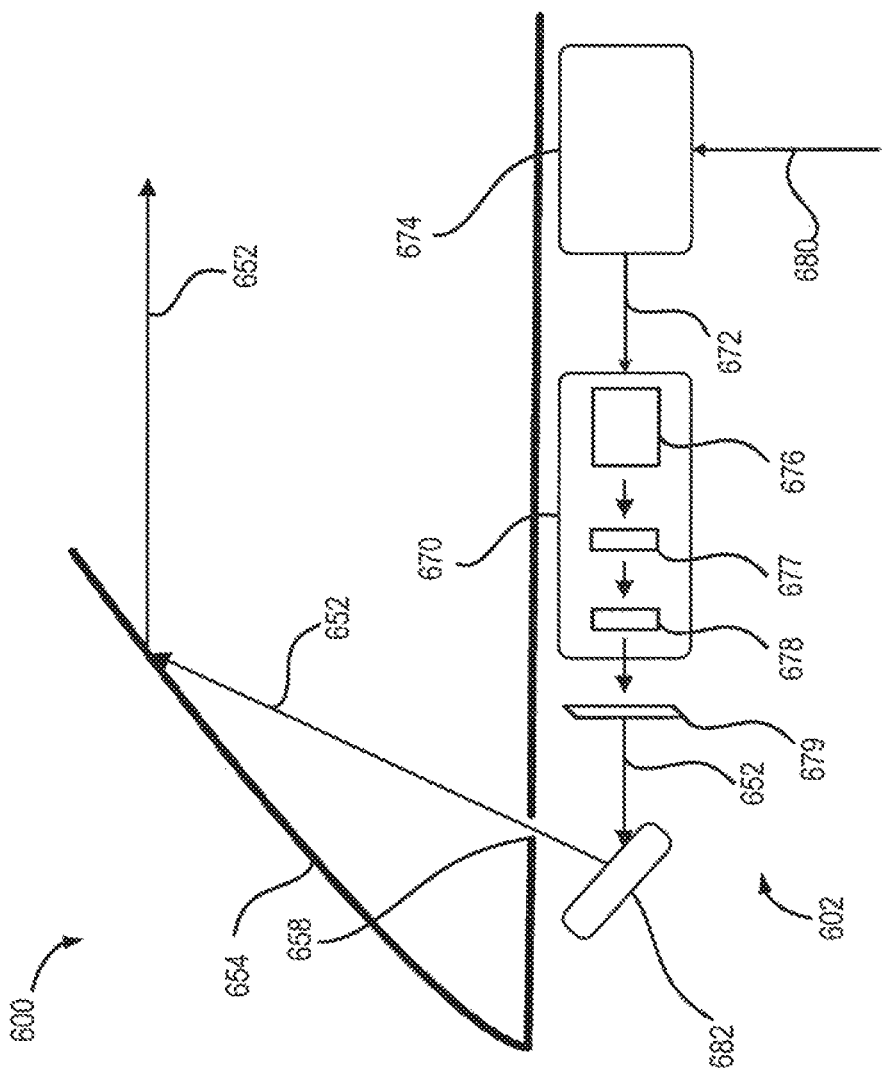

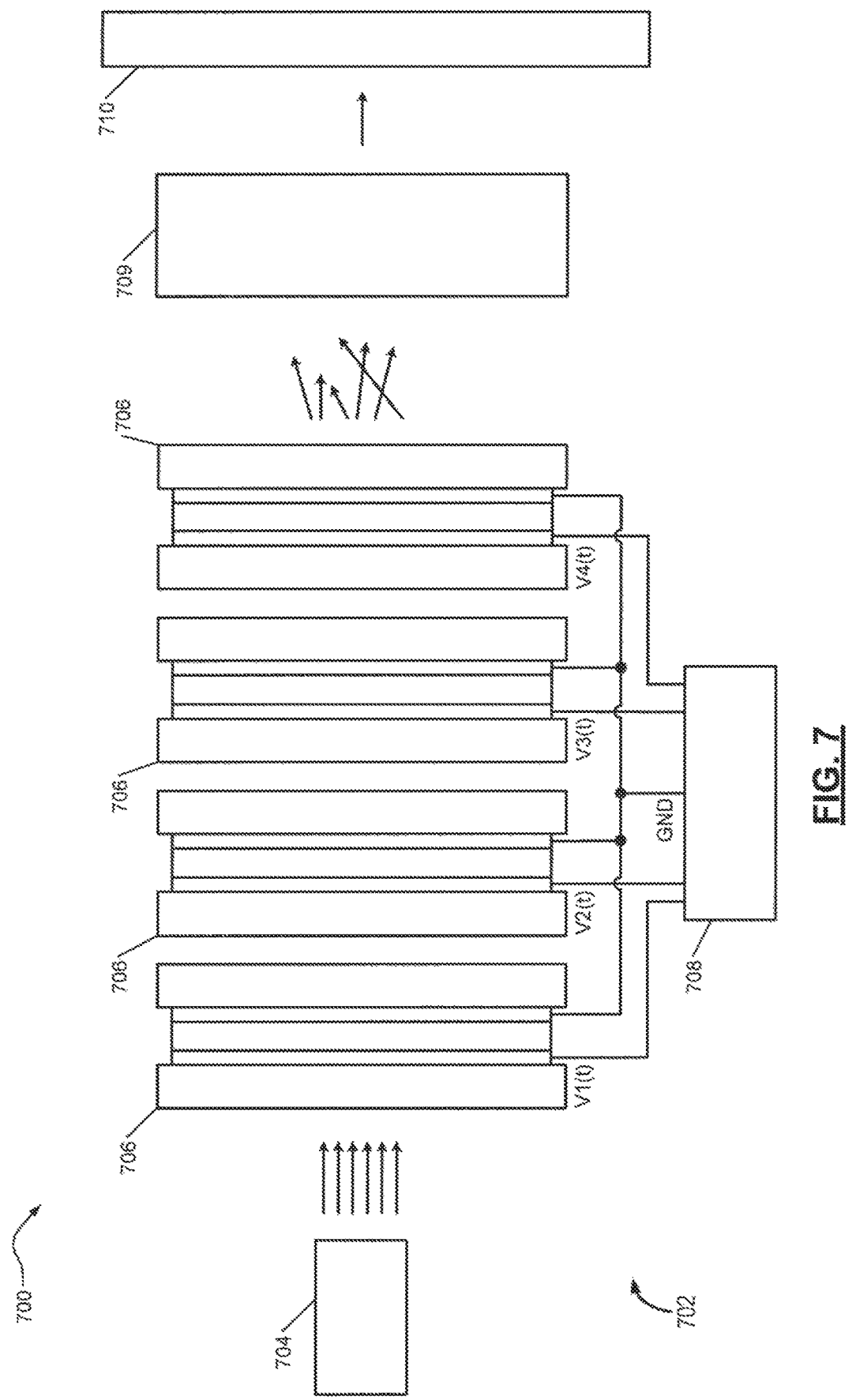

SPECKLE CONTRAST REDUCTION INCLUDING HIGH-SPEED GENERATION OF IMAGES HAVING DIFFERENT SPECKLE PATTERNS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to optical devices, such as a display device, which includes a coherent light source.

Display devices are used in a variety of applications. Some example display devices are flat panel displays, projection displays, and head-up displays. Display devices can be either be of a transmission or reflection type. As an example, a vehicle may include one or more displays, such as an infotainment system display or a head-up display (HUD) that displays information on a windshield of the vehicle. The HUD may display a vehicle speed and other vehicle information (e.g., warnings like lane departure warnings and collision avoidance warnings). Many display systems include a liquid crystal display (LCD) component.

SUMMARY

A speckle reduction system is provided and includes a first speckle reduction component and a control module. The first speckle reduction component includes first electrode layers and a first liquid crystal layer. The first liquid crystal layer is disposed between the first electrode layers and configured to receive light from a coherent light source. The control module is configured to (i) supply a first voltage signal having a first voltage to the first electrode layers to provide a first speckle pattern output, and (ii) supply a second voltage signal having a second voltage to the first electrode layers to provide a second speckle pattern output, wherein the first voltage and the second voltage are greater than zero. The control module is configured to transition between providing the first voltage signal and the second voltage signal in less than at least one of half an integration time of a human eye or 8 milliseconds.

In other features, the speckle reduction system further includes a second speckle reduction component including: second electrode layers; and a second liquid crystal layer disposed between the second electrode layers and configured to receive light from the first speckle reduction component. The control module is configured to supply a third voltage signal to the second electrode layers to provide a third speckle pattern output.

In other features, each of the first speckle reduction component and the second speckle reduction component includes substrates.

In other features, only a single substrate is disposed between the first liquid crystal layer and the second liquid crystal layer.

In other features, the second speckle reduction component is in direct contact with the first speckle reduction component.

In other features, the second liquid crystal layer comprises a different material than the first liquid crystal layer.

In other features, the control module provides the first voltage signal having a first frequency and the second voltage signal having a second frequency. The second frequency is different than the first frequency.

In other features, the control module provides the first voltage signal having a first current level and the second voltage signal having a second current level. The second current level is different than the first current level.

In other features, the control module is configured to supply a third voltage signal having a third voltage to the first electrode layers to provide a third speckle pattern output. The third voltage is greater than zero. THe control module is also configured to transition between providing the first voltage signal, the second voltage signal and the third voltage signal in less than the at least one of half the integration time of the human eye or 8 milliseconds.

In other features, a speckle reduction system is provided and includes speckle reduction components and a control module. The speckle reduction components include a first speckle reduction component and a second speckle reduction component. The first speckle reduction component includes first electrode layers and a first liquid crystal layer disposed between the first electrode layers and configured to receive light from a coherent light source. The second speckle reduction component includes second electrode layers and a second liquid crystal layer disposed between the second electrode layers and configured to receive light from the first speckle reduction component. The control module is configured to (i) supply a first voltage signal having a first voltage to the first electrode layers to provide a first speckle pattern output, and (ii) supply a second voltage signal having a second voltage to the second electrode layers to provide a second speckle pattern output. The first voltage and the second voltage are greater than zero.

In other features, the control module is configured to transition between providing the first voltage signal and the second voltage signal in less than at least one of half an integration time of a human eye or 8 milliseconds.

In other features, each of the first speckle reduction component and the second speckle reduction component includes multiple substrates.

In other features, only a single substrate is disposed between the first liquid crystal layer and the second liquid crystal layer.

In other features, the second speckle reduction component is in direct contact with the first speckle reduction component.

In other features, the second liquid crystal layer comprises a different material than the first liquid crystal layer.

In other features, the control module provides the first voltage signal having a first frequency and the second voltage signal having a second frequency. The second frequency is different than the first frequency.

In other features, the control module provides the first voltage signal having a first current level and the second voltage signal having a second current level. The second current level is different than the first current level.

In other features, the control module is configured to control the speckle reduction components to provide three or more speckle patterns in less than at least one of half an integration time of a human eye or 8 ms.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5A is a functional diagram of a portion of a speckle reduction system including a cross-sectional side view of an example structure of a SRC including a microparticle-doped liquid crystal layer in an OFF state in accordance with an embodiment of the present disclosure;

FIG. 5B is a functional diagram of the portion of the speckle reduction system of FIG. 5A and a cross-sectional side view of the SRC of FIG. 5A in an ON state;

FIG. 6 is a functional block diagram of a head-up display system incorporating a speckle reduction system in accordance with an embodiment of the present disclosure;

FIG. 7 is a functional block diagram of a projection system incorporating a collimation and imaging optics and a speckle reduction system in accordance with an embodiment of the present disclosure.

In the drawings, reference numbers may be reused to identify similar and/or identical elements.

DETAILED DESCRIPTION

Display systems often employ a source of coherent light, such as a laser, in conjunction with the other display components, such as LCD components. Coherent light may refer to light that is spatially and temporally in-phase. A large amount of "speckle" can arise when coherent light is reflected off a diffused surface. When coherent light is reflected from a diffused surface, various points on the surface each emit a light wave. Typically, the reflected light waves have a same frequency, but the phase of the light reflected from different points on the surface can vary resulting in granular, non-uniform intensity due to quasi-random interference. The reflected light interferes constructively and destructively to produce a random pattern of light and dark spots or bands. The overall non-uniform pattern is referred to as "speckle". When forming an image from the reflected light, the speckles add noise to an image.

The examples set forth herein include speckle reduction components (SRCs), which reduce an amount of speckle contrast. The speckle contrast is a value defined as the ratio of the standard deviation of the intensity distribution and the average of intensity distribution. If a screen has a same brightness everywhere, the standard deviation from average is zero and thus there are zero speckles. However, due to coherence and a narrow spectrum of a laser light beam, random interference patterns occur. Hence, the reflected light from a surface illuminated with laser light appears to have dark regions and bright regions or laser speckle. These laser speckle patterns can change visually with the slight movement of viewer's viewing position, which can be quite bothersome to viewers. Further, displays with a highly coherent laser light source (e.g., laser) can suffer from grainy images due to high speckle contrast.

The examples set forth herein include one or more SRCs that are controlled to provide at least one speckle pattern within half of the integration time of a human eye in order to create an averaging effect of the speckle patterns and to minimize the flickering. In some embodiments, the SRCs are stacked to provide numerous possible speckle patterns. The larger the number of speckle patterns provided within half the integration time of the human eye, the smaller the speckle contrast.

Figure 1:
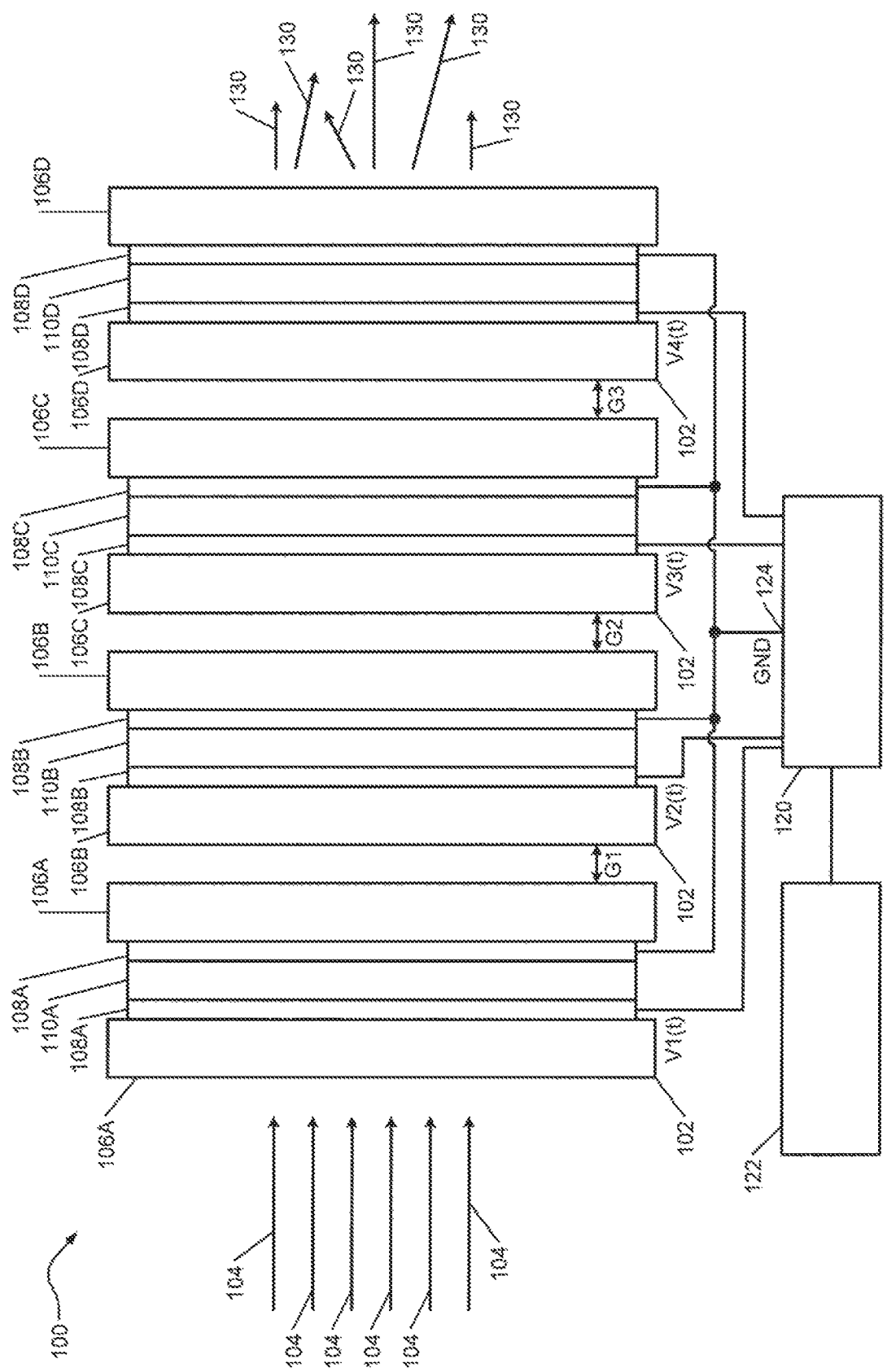
FIG. 1 is a functional block diagram of an example of a speckle reduction system including spaced apart speckle reduction components (SRCs) in accordance with an embodiment of the present disclosure.

FIG. 1 shows a speckle reduction system 100 including spaced apart speckle reduction components (SRCs) 102. Although four SRCs are shown, any number of SRCs may be included and arranged in a series as shown, such that coherent light (e.g., laser light), represented by arrows 104, passes through the SRCs 102. The coherent light 104 passes through the SRCs 102 in a successive manner. The coherent light may be in a visible range, an ultraviolet range, or infrared range. Each of the SRCs 102 includes at least a pair of substrates 106 (pairs 106A-106D are shown), a pair of electrode layers 108 (pairs 108A-108D are shown), and a liquid crystal layer 110. The substrates 106 and the electrode layers 108 are transparent.

A control module 120 is connected to the electrode layers 108 and supplies power received from a power source 122 to one of the electrode layers in each of the pairs of electrode layers 108. The other electrode layers are connected to a ground reference terminal 124. The voltage signals provided by the control module 120 to the liquid crystal layers 110 are represented as $V1(t)$-$V4(t)$.

The liquid crystal layers 110 may be in an OFF (or transparent) state and an ON (phase varying and/or opaque) state. The amount of transparency and/or how opaque one of the liquid crystal layers is depends on the voltage, current level and frequency of the voltage signal applied to that liquid crystal layer. The control module 120 controls the speckle patterns generated, the number of different speckle patterns generated and the frequency at which different speckle patterns are provided by controlling voltages, current levels, frequencies and/or timing of the voltage signals $V1(t)$-$V4(t)$.

To activate the liquid crystal layers 110, the control module 120 supplies the voltage signals $V1(t)$-$V4(t)$. The voltage signals $V1(t)$-$V4(t)$ may be at the same voltage, current level and/or frequency or at different voltages, current levels and/or frequencies. The voltage, current level and/or frequency of each of the voltage signals $V1(t)$-$V4(t)$ may be adjusted by the control module 120 to provide different speckle patterns. The material makeup of the liquid crystal layers 110 may be different, such that each of the SRCs 102 provides a different speckle pattern when a same voltage, current level and frequency are applied to each of the liquid crystal layers 110 at respective times. Scattered low coherent light output by the speckle reduction system 100 is represented by arrows 130 and has the speckle patterns generated via the control module 120.

The speckle reduction system 100 may project N different speckle configurations during an integration time of a camera and/or human eye. Measured and/or perceived speckle contrast is reduced by $\sqrt{N}$, where N is the number of difference speckle patterns provided during the integration time. In one embodiment, N is greater than 1. The SRCs 102 are switchable optical components configured to provide N different speckle patterns within the integration time, which may be less than 16 milliseconds (ms). By switching between different speckle patterns in less than 8 ms, i.e., at least two different speckle patterns provided in 16 milliseconds, flickering is avoided. If a response time of each of the SRCs is small enough, then a minimum of one SRC is included and a voltage, a current level and/or a frequency applied to the SRC is adjusted to provide multiple speckle patterns in less than the integration time. If the response time of each of the SRCs is not small enough, then two or more SRCs is included to provide multiple speckle patterns in less than the integration time. The more SRCs included the more possible speckle reduction patterns that can be generated.

The switchable optical components respond to external applied voltages creating electric fields with varying and/or random optical phase modulation distribution, which creates varying speckle configurations. In an embodiment, optical phase modulation across one or more of the liquid crystal layers 110 is varied to induce change of phase of light in different regions of the liquid crystal layers 110. At any instance in time, at least one of the optical components is switched to a phase-varying state. At any instance in time one or more of the optical components may remain in a high transmittance state (i.e. the amount of transmittance is greater than a predetermined amount). At certain instances, none of the optical components may remain in a high transmittance state. One of the phase-varying states is opaque. The speckle reduction system is void of motorized parts and does not, for example, include rotating and/or vibrating diffusers.

As an example, Gaps G1-G3 may exist between the SCRs 102. The gaps may be the same or different in size. In one embodiment, the size of the gaps is minimized. In one embodiment, the SRCs 102 are in contact with each other, such that there are no gaps between the SRCs 102.

Figure 2:
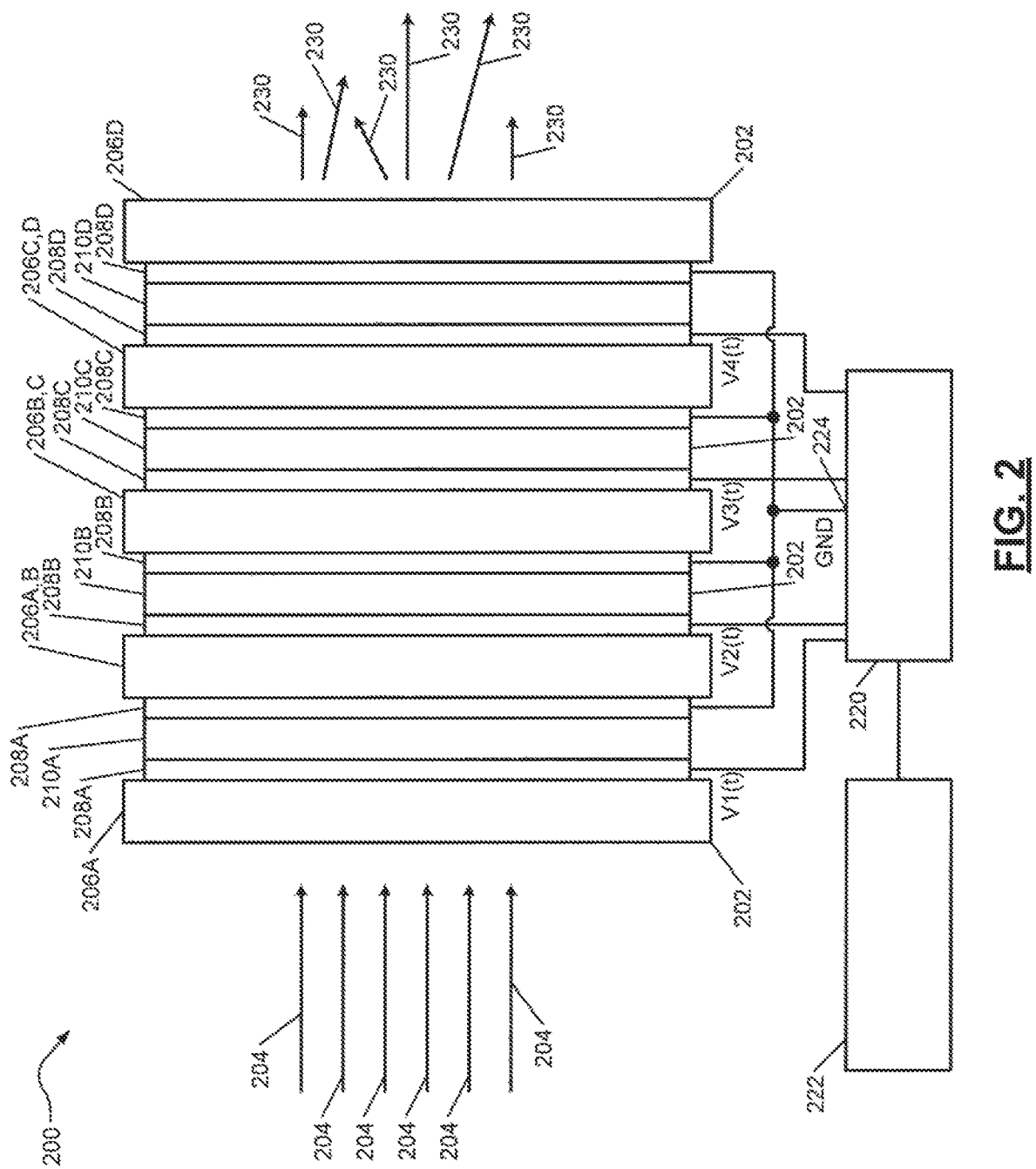
FIG. 2 is a functional block diagram of another example of a speckle reduction system including stacked SRCs in accordance with an embodiment of the present disclosure.

FIG. 2 shows a speckle reduction system 200 including stacked SRCs 202, which operate similarly as the SRCs 102 of FIG. 1. Although four SRCs are shown, any number of SRCs may be included and arranged in a series as shown, such that coherent light (e.g., laser light), represented by arrows 204, passes through the SRCs 202 in succession. The coherent light may be in a visible range, an ultraviolet range, or infrared range. Each of the SRCs 202 includes a corresponding pair of substrates 206 (pairs 208A-208D are shown), a pair of electrode layers 208 (pairs 208A-208D are shown), and a liquid crystal layer 210. The substrates 206 and the electrode layers 208 are transparent. Each of the substrates 206A,B, 206B,C, and 206C,D is shared by two adjacent ones of the SRCs 202. No gaps exist between the SRCs 202. By sharing substrates and having no gaps between SRCs a compact SRC structure is provided.

A control module 220 is connected to the electrode layers 208 and supplies power received from a power source 222 to one of the electrode layers in each of the pairs of electrode layers 208. The other electrode layers are connected to a ground reference terminal 224. The voltage signals provided by the control module 220 to the liquid crystal layers 210 are represented as V1(t)-V4(t).

The liquid crystal layers 210 may be in an OFF (or transparent) state and an ON (phase varying and/or opaque) state. The amount of transparency and/or how opaque one of the liquid crystal layers is depends on the voltage, current level and frequency of the voltage signal applied to that liquid crystal layer. The control module 220 controls the speckle patterns generated, the number of different speckle patterns generated and the frequency at which different speckle patterns are provided by controlling voltages, current levels, frequencies and/or timing of the voltage signals V1(t)-V4(t).

To activate the liquid crystal layers 210, the control module 220 supplies the voltage signals V1(t)-V4(t). The voltage signals V1(t)-V4(t) may be at the same voltage, current level and/or frequency or at different voltages, current levels and/or frequencies. The voltage, current level and/or frequency of each of the voltage signals V1(t)-V4(t) may be adjusted by the control module 220 to provide different speckle patterns. The material makeup of the liquid crystal layers 210 may be different, such that each of the SRCs 202 provides a different speckle pattern when a same voltage, current level and frequency are applied to each of the liquid crystal layers 210 at respective times. Scattered low coherence light output by the speckle reduction system 200 is represented by arrows 230 and has the speckle patterns generated via the control module 220.

The SRCs 202 are electrically-switchable optical devices. Spatial phase modulation distribution of the liquid crystal layers 210 varies with applied voltage. When coherent light passes through the SRCs 202 having spatial varying phase modulation distribution, the speckle configurations of the SRCs 202 vary with different applied voltages. Each of the SRCs 202 has at least one voltage state with high transmittance. The SRCs 202 may be in a stacked array and the control module 220 may be programmed to apply voltages in a time-sequential manner to each of the SRCs 202.

The liquid crystal layers 110, 210 of FIGS. 1-2, may include nanoparticle-doped liquid crystals, microparticle-doped liquid crystals, liquid crystals with polymer networks, liquid crystals with a chiral dopant, and/or a combination thereof. Other examples of the liquid crystal layers 110, 210 and other layers of SRCs are shown in FIGS. 4A-5B.

The SRCs 110, 210 may be driven by the control modules 120, 220 in a time-sequential manner and/or time-multiplexing manner. The control modules 120, 220 may be preprogrammed to send a selected driving signal (or set of driving signals, such as the voltage signals V1(t)-V4(t)) according to a selected driving scheme selected among multiple available driving schemes to induce a corresponding speckle pattern. The timing difference between different selected driving signals (or sets of driving signals) is less than half the integration time of a human eye and/or camera to have two or more speckle patterns projected within the integration time. As a simplified example, a driving signal may be high or '1' when operating in a spatial varying phase modulation distribution state and may be '0' when operating in a transparent state. As an example, three or more state values and corresponding voltages may be available when implementing a "gray scale" with varying levels of transparency. Gray scale refers to values between 0 and 1, where 0 is fully deactivated and 1 is fully activated. In this implementation, two or more non-fully transparent states are available and are selected at certain times.

Table 1 shows an example of different activation states for different times, where each of the activation states provides different speckle patterns. In a binary implementations, where each SRC receives only one of two different voltage signals; either a '1' or a '0', $2^N$ (or 16 if N is 4) possible speckle patterns may be provided.

TABLE 1

Example States of Voltage Signals at Different Times

|       | t1 | t2 | t3 | t4 | t5 | ... |
|-------|----|----|----|----|----|-----|
| V1(t) | 1  | 0  | 0  | 0  | 0  | ... |
| V2(t) | 0  | 1  | 0  | 0  | 0  | ... |
| V3(t) | 0  | 0  | 1  | 0  | 1  | ... |
| V4(t) | 0  | 0  | 0  | 1  | 1  | ... |

In one example embodiment, multiple SRCs are included per millimeter with no air gaps between the SRCs. As an example, 7 SRCs may be included per millimeter, where each of the substrates are 100 microns thick and the other layers of each of the SRCs are collectively 24 microns thick. In another example embodiment, the 3 SRCs are included per millimeter. The number of SRCs included per millimeter depends on the thickness of the layers of the SRCs.

Figure 3:
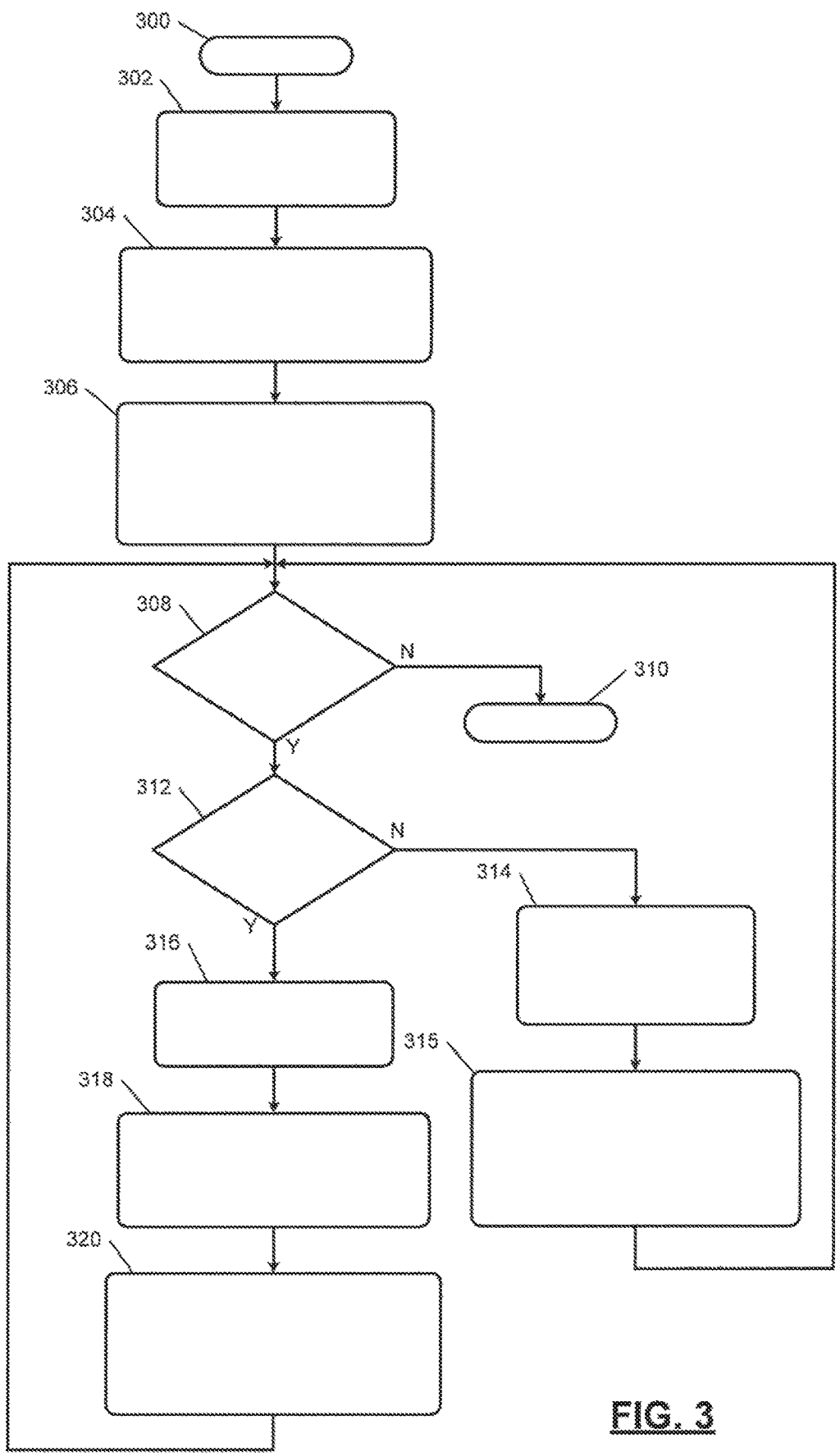
FIG. 3 illustrates an example speckle reduction method in accordance with an embodiment of the present disclosure.

FIG. 3 shows a speckle reduction method. Although the following operations are primarily described with respect to the implementations of FIGS. 1-2, the operations may be easily modified to apply to other implementations of the present disclosure. The operations may be iteratively performed. The method may begin at 300. At 302, a control module (e.g., one of the control modules 120, 220 of FIGS. 1-2) selects a first set of one or more SRCs (e.g., one or more of the SRCs 102, 202) to activate. In one embodiment, the control module operates as a random number generator and generates an integer number m, where 1 where K is a total number of possible speckle patterns and/or driving schemes. The generated number m refers to the activation of one or more of the SRCs.

At 304, the control module sets parameters of the first set of one or more SRCs according to a first or default set of parameters. The parameters may include voltages, current levels, and/or frequencies of one or more voltage signals applied to the first set of one or more SRCs. At 306, the control module activates (or addresses) the selected first set of one or more SRCs and operates the SRCs according to selected parameters to provide a speckle pattern. The selected first set of one or more SRCs may be activated for a predetermined period of time and then deactivated. The SRCs may be deactivated prior to or subsequent to performing the following operations 308, 312, 314, 316 and/or 318.

At 308, the control module determines whether to generate another speckle pattern. As an example, the control module may operate to generate a predetermined number of speckle patterns within half the integration time, as described above. If the predetermined number of speckle patterns has been generated, then the method may end at 310. If another speckle pattern is to be generated, then operation 312 may be performed. A counter may be implemented to count the number of speckle patterns generated. When the counter reaches the predetermined number, then the method may end at 310.

At 312, the control module determines whether to activate a different one or more SRCs than previously generated during the last activation state. If the same set of SRCs are to be activated, then operation 314 may be performed. If a different set of SRCs are to be activated, then operation 316 may be performed.

At 314, the control module adjusts the parameters for the last previously activated SRCs. This may include adjusting voltages, current levels, and/or frequencies of the corresponding voltage signals. At 315, the control module activates the last previously activated SRCs according to the adjusted parameters to provide another speckle pattern. The SRCs may be deactivated prior to or subsequent to performing the following operations 308, 312, 314, 316 and/or 318. Operation 308 may be performed after operation 315.

At 316, the control module selects another set of one or more SRCs to activate that is different than the last previously selected one or more SRCs. At 318, the control module sets parameters of the another set of one or more SRCs. The parameters may be the same parameters as used for the last activated set of SRCs or may be a different set of parameters. At 320, the control module activates the another set of one or more SRCs and operates the SRCs according to the set of parameters set at 318 to provide another speckle pattern. The SRCs may be deactivated prior to or subsequent to performing the following operations 308, 312, 314, 316 and/or 318. Operation 308 may be performed after operation 320.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

During an implementation of the above-described method, N different speckle patterns may be generated within half the integration time, where N is greater than or equal to 2. The speckle reduction system performing the method may have M SRCs, where M is greater than or equal to 1 and less than or equal to N. The relationship between M and N is based on how opaque the SRCs are when in an activated state. For example, if there is sufficient light transmittance through the SRCs when all of the SRCs are in an opaque (or fully activated) state, then M may be equal to N. If however, there is not a sufficient amount of light passing through the SRCs when all of the SRCs are in an opaque state, then one or more of the SRCs are deactivated at any moment in time. A total number of available speckle patterns (or liquid crystal layer configurations) and corresponding driving schemes may be represented by equation 1, where K is the number of different speckle patterns and driving schemes and C is a number of possible combinations (or a number of possible speckle patterns for a selected number of activated SRCs. For example, if 4 SRCs are utilized and 2 are being selected, then $C_2^4$ is the number of possible speckle patterns when 2 of the 4 SRCs are activated. If this is a binary implementation, where each SRC is in one of two possible states, then C is equal to 6. In this binary implementation K is equal to $2^4$.

$$K = C_0^N + C_1^N + C_2^N + \ldots + C_M^N = \sum_{i=0}^{M} C_i^N \qquad (1)$$

If for example there are 3 possible states for each SRC, then there are $3^N$ number of possible speckle patterns. In general, if there are P possible states for each SRC, then there are $P^N$ number of possible speckle patterns.

As another simplified example, if two SRCs are used and there are three possible configuration states to switch between, then a speckle reduction of 47% is provided. Table 2 shows speckle contrasts for each of the three states, the average speckle contrast, and the speckle contrast reduction percentage.

TABLE 2

Example Speckle Contrast and Speckle Contrast Reduction Values for Three Possible Speckle Patterns.

| | Speckle Contrast | Speckle Contrast Reduction |
|---|---|---|
| Clear State (SRC1 and SRC2 OFF) | 0.51 | NA |
| Scattering State 2 (SRC2 ON, SRC1 OFF) | 0.35 | NA |
| Average | 0.27 | 47% (with clear state as baseline) |

As another example, a total number of speckle patterns N' to be projected within the integration time may be determined using equation 3 or 4, where SC is speckle contrast for an individual speckle pattern and SDL is a speckle detection limit.

$$SC \cdot \frac{1}{\sqrt{N'}} = SDL \quad (3)$$

$$N' = \left[\frac{SC}{SDL}\right]^2 \quad (4)$$

As another example, if SC is 0.7 and SDL is 0.03, then N' is approximately 545. As yet another example, if SC is 0.35 and SDL is 0.03, then N' is 136. As a result, a wide range of possible speckle patterns may be provided (e.g., 2 to approximately 545 possible speckle patterns). Depending on the speckle contrast of each SRC in an activated state, the range may decrease (e.g., 2 to approximately 140 possible speckle patterns). A single SRC may be used to provide multiple different speckle patterns by varying the above-stated parameters. Each SRC may have two or more possible speckle patterns. The above-stated values are provided as examples; other values may be provided depending on the number of SRCs, the makeup of the liquid crystal layers of the SRCs, the number of parameters of the voltage signals applied to the SRCs being adjusted, the spacing between SRCs, etc.

Figure 4B:
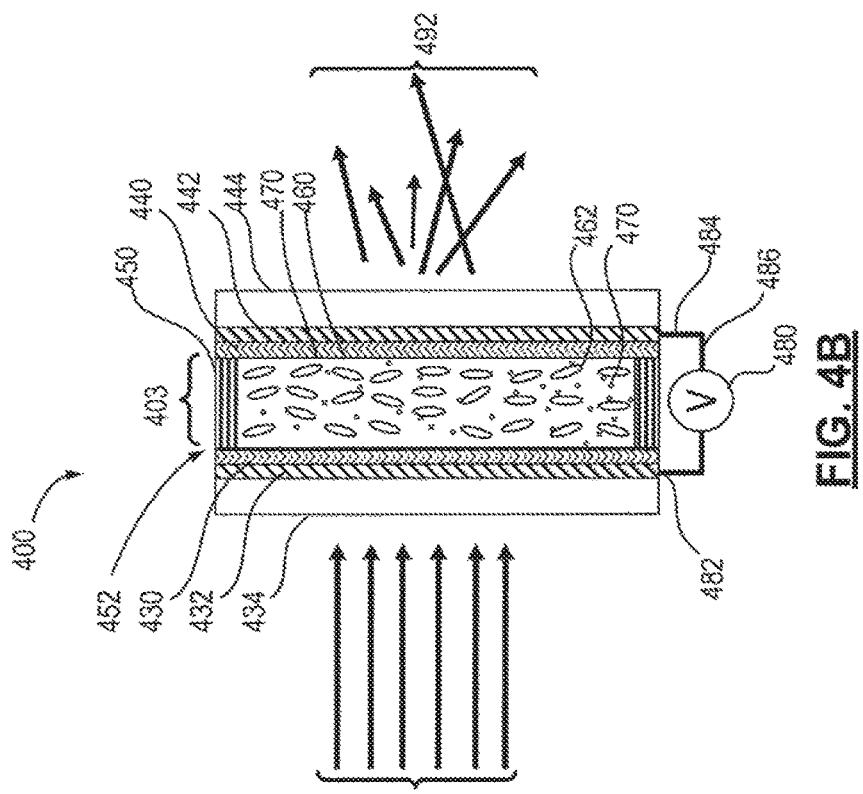
FIG. 4B is a functional diagram of the portion of the speckle reduction system of FIG. 4A and a cross-sectional side view of the SRC of FIG. 4A in an ON state.
Figure 4A:
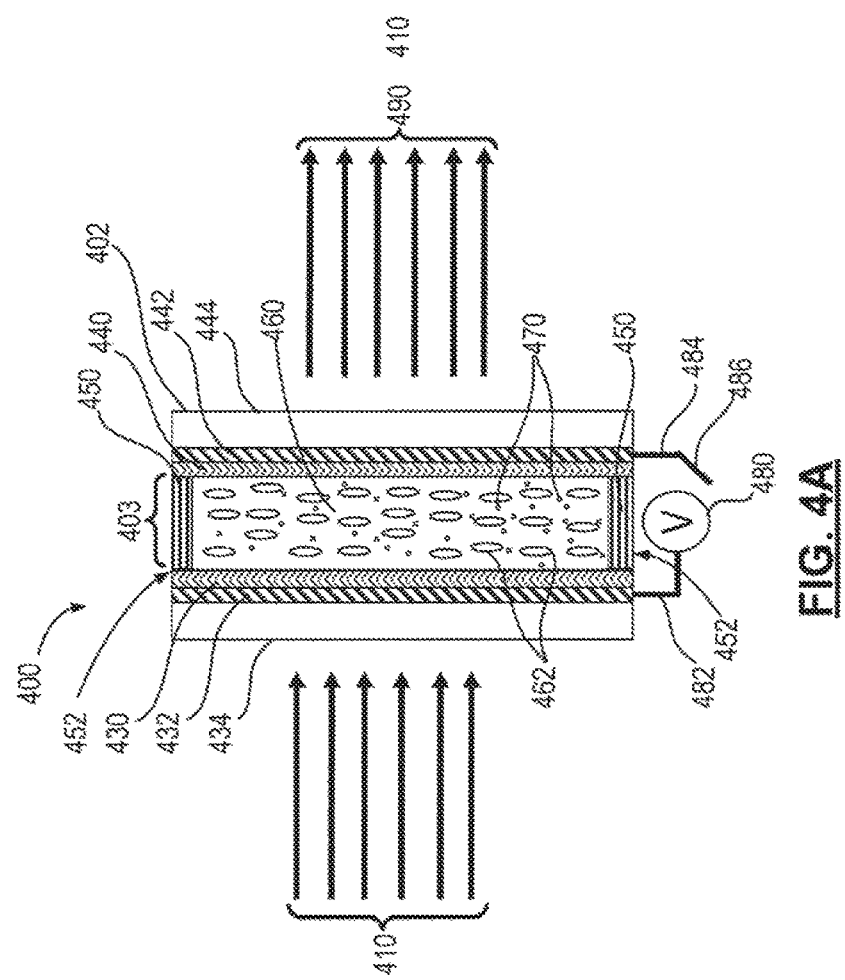
FIG. 4A is a functional diagram of a portion of a speckle reduction system including a cross-sectional side view of an example structure of a SRC including a nanoparticle-doped liquid crystal layer in an OFF state in accordance with an embodiment of the present disclosure.

FIGS. 4A and 4B show a portion of a speckle reduction system 400 including a SRC 402 including a nanoparticle-doped liquid crystal layer 403 in OFF and ON states. The SRC 402 is configured to receive and in certain operational states, to transmit a coherent light beam 410 generated by a coherent light source or laser (like laser 676 in FIG. 6).

The SRC 402 may include a first alignment layer 430 and a second alignment layer 440, a first electrode 432 and a second electrode 442. The alignment layers 430, 440 are planar. The electrodes 432, 442 may be transparent to the coherent light beam 410. The electrodes 432, 442 are disposed adjacent to respective first and second alignment layers 430, 440 (each having a surface morphology that induces a predetermined orientation of liquid crystals upon application of current thereto). The alignment layers 430, 440 are optional components and may be combined with the electrodes 432, 442 when a surface of each respective electrode facing the liquid crystals is patterned. The electrodes 432, 442 may be formed of indium tin oxide (ITO), metallic nanowires, metallic particles, gallium zinc oxide, aluminum gallium zinc oxide, poly(3,4-ethylenedioxythiophene) (PEDOT), and/or combinations thereof. The electrodes 432, 442 may be patterned.

The first electrode 432 is disposed on a first transparent substrate 434. The first electrode 432 and the first substrate 434 are configured to transmit at least a portion of the coherent light beam 410. The second electrode 442 is disposed on a second transparent substrate 444. The second electrode 442 and the second substrate 444 are configured to transmit at least a portion of the coherent light beam 410. The substrates 434, 444 may be transparent to the coherent light beam 410 and may be formed of a glass (e.g., silica or a borosilicate) or a polymer, such as plastic.

The SRC 400 may also include spacers 450 that are disposed between the first alignment layer 430 and the second alignment layer 440. The spacers 450 define portion of a perimeter 452 of a liquid crystal layer 460. The liquid crystal layer 460 includes liquid crystals 462 and nanoparticles 470. The diameters of the nanoparticles 470 may be between 1 nanometer and 100 nanometers. 1-10% by weight of the liquid crystal layer 460 may be the nanoparticles 470. The refractive index of the liquid crystal layer 460 may be 1.48-2.0. The liquid crystals 462 may be negative nematic liquid crystals or ferroelectric liquid crystals. Ferroelectric liquid crystals have fast switching characteristics.

The electrodes 432, 442 are connected to a power source 480 via a switch 486 and leads 482, 484. The switch 486 may be controlled by a control module, such as one of the control modules described above. The first electrode 432 may be electrically connected to the power source 480 via the first lead 482. The second electrode 442 may be electrically connected to the power source 480 via the second lead 484.

In a first operational state shown in FIG. 4A, the switch 486 is in an open or non-activated position, such that no voltage is applied to the second lead 484. As shown in FIG. 4A, the electric field is off and coherent light beam 410 exits the SRC 400 as a first output 490. The first output 490 is a coherent light beam that is transmitted through the liquid crystal layer 460 and exhibits speckle contrast.

In a second operational state shown in FIG. 4B, the switch 486 is in a closed or activated position, such that a voltage is applied to the first lead 482 and the second lead 484. By applying an electric field to the liquid crystals 462, the liquid crystals 462 are destabilized and induced to move. The instability of liquid crystals 462 in the second operational state reduces laser speckle contrast. With the nanoparticles 470, the electro-optical properties, for example, the forward scattering intensity, can be tuned. A second output 492 generated during the second operational state has low coherence and reduced speckle contrast.

FIGS. 5A-5B show a portion of a speckle reduction system 500 including a SRC 502 having a microparticle-doped liquid crystal layer 503 in OFF and ON states. The SRC 502 is configured to receive and in certain operational states, to transmit a coherent light beam 510 generated by a coherent light source or laser (like laser 676 in FIG. 6).

The SRC 502 may include a first alignment layer 530 and a second alignment layer 540, a first electrode 532 and a second electrode 542. The alignment layers 530, 540 are planar. The electrodes 532, 542 may be transparent to the coherent light beam 510. The electrodes 532, 542 are disposed adjacent to respective first and second alignment layers 530, 540 (each having a surface morphology that induces a predetermined orientation of liquid crystals upon application of current thereto). The alignment layers 530, 540 are optional components and may be combined with the electrodes 532, 542 when a surface of each respective electrode facing the liquid crystals is patterned. The electrodes 532, 542 may be formed of indium tin oxide (ITO), metallic nanowires, metallic particles, gallium zinc oxide, aluminum gallium zinc oxide, poly(3,4-ethylenedioxythiophene) (PEDOT), and/or combinations thereof. The electrodes 532, 542 may be patterned.

The first electrode 532 is disposed on a first transparent substrate 534. The first electrode 532 and the first substrate 534 are configured to transmit at least a portion of the coherent light beam 510. The second electrode 542 is disposed on a second transparent substrate 544. The second electrode 542 and the second substrate 544 are configured to transmit at least a portion of the coherent light beam 510. The substrates 534, 544 may be transparent to the coherent light beam 510 and may be formed of a glass (e.g., silica or a borosilicate) or a polymer, such as plastic.

The SRC 500 may also include spacers 550 that are disposed between the first alignment layer 530 and the second alignment layer 540. The spacers 550 define portion of a perimeter 552 of a liquid crystal layer 560. The liquid crystal layer 460 includes liquid crystals 562 and microparticles 570. The microparticles may be formed of silica. The diameters of the microparticles 570 may be between 1 micrometer and a cell thickness. The liquid crystals 562 may be positive dielectric anisotropy (pattern electrode included) liquid crystals or negative anisotropy (pattern electrode may not be included) liquid crystals.

The electrodes 532, 542 are connected to a power source 580 via a switch 586 and leads 582, 584. The switch 586 may be controlled by a control module, such as one of the control modules described above. The first electrode 532 may be electrically connected to the power source 580 via the first lead 582. The second electrode 542 may be electrically connected to the power source 580 via the second lead 584. Voltages applied to the electrodes 532, 542 induce instability of the liquid crystals 562 and hence move the microparticles 570 in a random manner. Speckle contrast is reduced due to an averaging effect from moving the microparticles 570.

In a first operational state shown in FIG. 5A, the switch 586 is in an open or non-activated position, such that no voltage is applied to the second lead 584. As shown in FIG. 5A, the electric field is off and coherent light 510 exits the SRC 500 as a first output 590. The first output 590 is a coherent light beam that is transmitted through the liquid crystal layer 560 and exhibits speckle contrast.

In a second operational state shown in FIG. 5B, the switch 586 is in a closed or activated position, such that a voltage is applied to the first lead 582 and the second lead 584. By applying an electric field to the liquid crystals 562, the liquid crystals 562 are destabilized and induced to move. The movement of the liquid crystals 562 induces the microparticles 570 to move. The movement of the microparticles 570 in the second operational state reduces laser speckle contrast. A second output 592 generated during the second operational state is non-coherent and has reduced speckle contrast.

FIG. 6 shows a head-up display system 600 incorporating a speckle reduction system 602. An image source 670 generates (e.g., projects) an image 652 based on signals 672 from a HUD control module 674. As an example, the image source 670 may include a coherent light source that generates a coherent light beam having a wavelength in the visible range. Thus, the image source 670 may include one or more lasers 676. The laser(s) 676 may create red, green, and blue light, by way of example. Collimation and imaging optics 677 and a set of SRCs 678 are also included in the image source 670. The SRCs 678 may include any of SRCs described herein. The HUD control module 674 may supply voltage signals to the SRCs as also described herein. The HUD control module 674 generates signals 672 sent to the image source 670 based on vehicle data 680 received from the vehicle. The signals 672 include the voltage signals.

The HUD control module 674 may obtain the vehicle data 680, for example, from a communication bus of the vehicle. The vehicle data 680 may include, for example, present speed of the vehicle, warnings, a present gear of a transmission of the vehicle, an engine speed, a directional heading of the vehicle, present infotainment system settings, and/or other vehicle information.

Output of the SRCs 678 is directed at a screen 679 to provide an image on the screen 679. An optional reflector 682 reflects the image 652 generated by the image source 670 onto the windshield 654 through the opening 658. A viewer can view the image 652 in the area where the image 652 is projected onto the windshield 654. In various implementations, the reflector 682 may be omitted, and the image source 670 may instead be configured to project the image 652 directly onto the windshield 654.

FIG. 7 shows first projection system 700 incorporating a speckle reduction system 702 and a coherent light source 704. The speckle reduction system 702 includes one or more SRCs 706 (four are shown in the example configuration of FIG. 1). The SRCs 706 may be replaced with the example configuration of FIG. 2 and/or with another configuration disclosed herein. The SRCs 706 include a control module 708, collimation and imaging optics 709 and a projection screen 710. The control module 708 may operate similarly as the other control modules disclosed herein and generate voltage signals, such as the voltage signals $V1(t)$-$V4(t)$.

Figure 8:
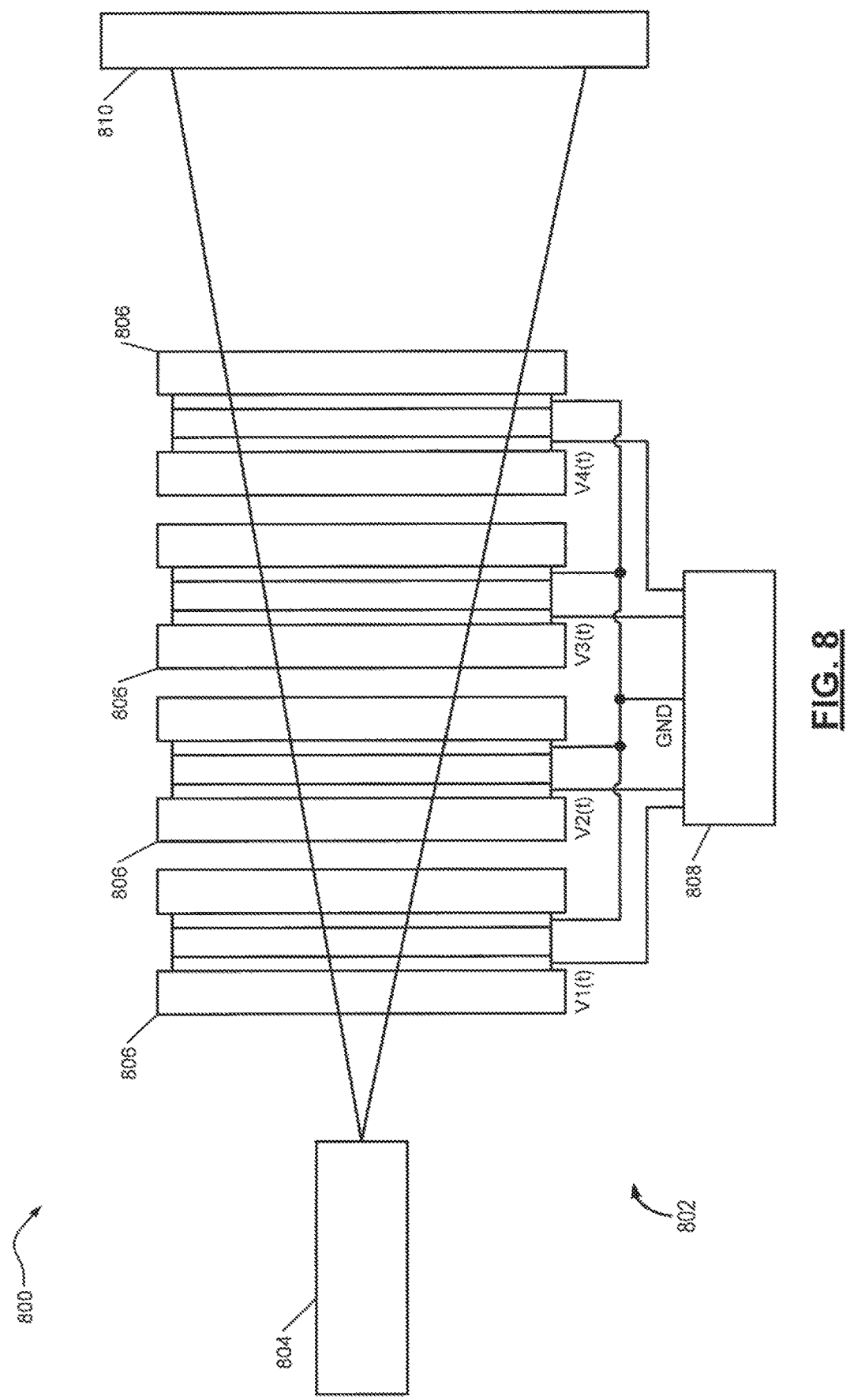
FIG. 8 is a functional block diagram of a projection system incorporating a speckle reduction system without collimation and imaging optics in accordance with an embodiment of the present disclosure.

FIG. 8 shows a second projection system 800 incorporating a speckle reduction system 802 and a light source (shown as a laser-based projector 804). The speckle reduction system 802 includes one or more SRCs 806 (four are shown in the example configuration of FIG. 1). The SRCs 806 may be replaced with the example configuration of FIG. 2 and/or with another configuration disclosed herein. The SRCs 806 include a control module 808 and a projection screen 810. The control module 808 may operate similarly as the other control modules disclosed herein and generate voltage signals, such as the voltage signals $V1(t)$-$V4(t)$.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A speckle reduction system comprising:
   a first plurality of speckle reduction components and a second plurality of speckle reduction components, the first plurality of speckle reduction components comprising a first speckle reduction component comprising
      a first plurality of electrode layers, and
      a first liquid crystal layer disposed between the first plurality of electrode layers and configured to receive light from a coherent light source; and
   a control module configured to
      supply a first voltage signal having a first voltage to the first plurality of electrode layers to provide a first speckle pattern output,
      supply a second voltage signal having a second voltage to the first plurality of electrode layers to provide a second speckle pattern output, wherein the first voltage and the second voltage are greater than zero, select and apply a first set of voltages to the first plurality of speckle reduction components to provide first speckle patterns at a first moment in time, wherein the first set of voltage includes the first voltage, select and apply a second set of voltages to the second plurality of speckle reduction components to provide second speckle patterns at a second moment in time, wherein the second speckle patterns are different than the first speckle patterns, and wherein the second set of voltages includes the second voltage, and directly transition, in less than at least one of half an integration time of a human eye or 8 milliseconds, from (i) applying the first set of voltages to the first plurality of speckle reduction components and not applying the second set of voltages to the second plurality of speckle reduction components to (ii) applying the second set of voltages to the second plurality of speckle reduction components and not applying the first set of voltages to the first plurality of speckle reduction components.

2. The speckle reduction system of claim 1, further comprising a second speckle reduction component comprising:

a second plurality of electrode layers; and a second liquid crystal layer disposed between the second plurality of electrode layers and configured to receive light from the first speckle reduction component, wherein the control module is configured to supply a third voltage signal to the second plurality of electrode layers to provide a third speckle pattern output.

3. The speckle reduction system of claim 2, wherein each of the first speckle reduction component and the second speckle reduction component comprises a plurality of substrates.

4. The speckle reduction system of claim 2, wherein only a single substrate is disposed between the first liquid crystal layer and the second liquid crystal layer.

5. The speckle reduction system of claim 2, wherein the second speckle reduction component is in direct contact with the first speckle reduction component.

6. The speckle reduction system of claim 2, wherein the second liquid crystal layer comprises a different material makeup than the first liquid crystal layer.

7. The speckle reduction system of claim 1, wherein:
the control module provides the first voltage signal having a first frequency and the second voltage signal having a second frequency; and
the second frequency is different than the first frequency.

8. The speckle reduction system of claim 1, wherein:
the control module provides the first voltage signal having a first current level and the second voltage signal having a second current level; and
the second current level is different than the first current level.

9. The speckle reduction system of claim 1, wherein:
the control module is configured to supply a third voltage signal having a third voltage to the first plurality of electrode layers to provide a third speckle pattern output;

the third voltage is greater than zero; and the control module is configured to transition between providing the first voltage signal, the second voltage signal and the third voltage signal in less than the at least one of half the integration time of the human eye or 8 milliseconds.

10. A speckle reduction system comprising:

a plurality of speckle reduction components comprising a first speckle reduction component, the first speckle reduction component comprising a plurality of electrode layers, and a liquid crystal layer disposed between the plurality of electrode layers and configured to receive light from a coherent light source; and a control module configured to supply a first voltage signal having a first voltage to the plurality of electrode layers to provide a first speckle pattern output, supply a second voltage signal having a second voltage to the plurality of electrode layers to provide a second speckle pattern output, wherein the first voltage and the second voltage are greater than zero, select and apply voltages to different sets of the plurality of speckle reduction components at different movements in time to provide different speckle patterns in less than at least one of half an integration time of a human eye or 8 milliseconds, wherein each of the sets of the plurality of speckle reduction components includes two or more speckle reduction components, and wherein the voltages include the first voltage and the second voltage, during a first period and to provide a first speckle pattern, apply the first voltage, a first current level and a first frequency to a first one of the sets of the plurality of speckle reduction components and not apply the second voltage, a second current level and a second frequency to a second one of the sets of the plurality of speckle reduction components, during a second period and to provide a second speckle pattern, apply the second voltage, the second current level and the second frequency to the second one of the sets of the plurality of speckle reduction components and not apply the first voltage, the first current level and the first frequency to the first one of the sets of the plurality of speckle reduction components, and transition between providing the first speckle pattern and the second speckle pattern in less than the at least one of half the integration time of the human eye or 8 milliseconds.

11. The speckle reduction system of claim 1, wherein at least one of the first voltage signal or the second voltage signal corresponds to a non-transparent grayscale level that is between 0 and 1, where 0 is fully deactivated and 1 is fully activated.

* * * * *